US010112776B2

(12) United States Patent
Rasi

(10) Patent No.: US 10,112,776 B2
(45) Date of Patent: Oct. 30, 2018

(54) DEVICE FOR DISTRIBUTING PRODUCTS IN ROLL

(71) Applicant: TISSUE MACHINERY COMPANY S.p.A., Castel Guelfo (Bologna) (IT)

(72) Inventor: Michele Rasi, Ferrara (IT)

(73) Assignee: TISSUE MACHINERY COMPANY S.P.A., Castel Guelfo (Bologna) (IT)

( * ) Notice: Subject to any disclaimer, the term of this patent is extended or adjusted under 35 U.S.C. 154(b) by 0 days.

(21) Appl. No.: 15/583,266

(22) Filed: May 1, 2017

(65) Prior Publication Data

US 2017/0320671 A1 Nov. 9, 2017

(30) Foreign Application Priority Data

May 5, 2016 (IT) .......................... 102016000046574

(51) Int. Cl.
*B65G 17/32* (2006.01)
*B65B 25/14* (2006.01)
(Continued)

(52) U.S. Cl.
CPC .......... *B65G 17/323* (2013.01); *B65B 25/146* (2013.01); *B65B 35/54* (2013.01);
(Continued)

(58) Field of Classification Search
CPC .... B65G 47/71; B65G 47/715; B65G 47/082; B65G 47/841; B65G 35/02; B65B 25/146
(Continued)

(56) References Cited

U.S. PATENT DOCUMENTS 5,331,788 A * 7/1994 Cinotti ................... B65B 11/20
53/228
5,465,550 A * 11/1995 Dall'Omo ............... B65B 59/04
53/224

(Continued)

FOREIGN PATENT DOCUMENTS

JP S52 157177 U 11/1977

*Primary Examiner* — William R Harp
(74) *Attorney, Agent, or Firm* — Renner, Otto, Boisselle & Sklar LLP

(57) ABSTRACT

Device for distributing products to feed lines, comprising: a plurality of outfeed channels (1) each configured for feeding a succession of products (2) along a first feed direction (D1); the plurality of outfeed channels (1) is positioned at a first level (H1); a plurality of infeed channels (3), configured to receive single or lines of products (2) and feed products (2), along a second feed direction (D3); the plurality of infeed channels (3) is positioned at a higher second level (H3), a plurality of pairs of carriages (4) defining corresponding housing pockets (5); a track (6) configured in the form of a closed, ring-shaped path to define a lower operating section (6a) and an upper operating section (6b) and on which move the plurality of pairs of carriages (4) along a direction (D6) transversal to the first (D1) and second (D3) feed directions; the track (6) is interposed between the plurality of outfeed channels (1) and the plurality of infeed channels (3) in such a way as to position along a lower operating section (6a), and in predetermined sequences, a first number of pairs of carriages (4) which can be faced towards corresponding outfeed channels (3) for picking up at least one corresponding product (2) and, along an upper operating section (6b), a second number of pairs of carriages (4) which can be faced towards the plurality of infeed channels (3) for releasing at least one corresponding product (2).

11 Claims, 5 Drawing Sheets

(51) Int. Cl.
    *B65B 35/54*    (2006.01)
    *B65G 47/71*    (2006.01)
    *B65G 47/84*    (2006.01)
    *B65G 17/12*    (2006.01)

(52) U.S. Cl.
    CPC .......... *B65G 47/71* (2013.01); *B65G 47/841* (2013.01); *B65G 17/12* (2013.01); *B65G 2201/0232* (2013.01)

(58) Field of Classification Search
USPC .... 198/427, 426, 473.1, 803.11, 803.13, 440
See application file for complete search history.

(56) References Cited

U.S. PATENT DOCUMENTS

| | | | | |
|---|---|---|---|---|
| 6,067,780 A * | 5/2000 | Gentili | ................... | B65B 11/22 53/230 |
| 6,691,492 B2 * | 2/2004 | Gamberini | ............. | B65B 11/20 53/230 |
| 6,799,410 B2 * | 10/2004 | Gamberini | ............. | B65B 11/20 53/224 |
| 7,032,358 B2 * | 4/2006 | Dall'omo | ................ | B65B 11/24 53/216 |
| 7,131,246 B2 * | 11/2006 | Dall'Omo | ............... | B65B 11/22 53/376.7 |
| 8,727,106 B2 * | 5/2014 | Bernardi | ................ | B65B 59/005 198/661 |
| 8,973,735 B2 * | 3/2015 | Overley | ................. | B65G 29/00 198/418.3 |
| 9,205,994 B2 * | 12/2015 | Overley | ................. | B65G 29/00 |
| 9,309,015 B2 * | 4/2016 | Overley | ................. | B65B 35/30 |
| 9,463,888 B2 * | 10/2016 | Overley | ................. | B65B 35/30 |
| 2002/0059784 A1 * | 5/2002 | Gamberini | ............. | B65B 11/20 53/531 |
| 2005/0229546 A1 * | 10/2005 | Poli | ........................ | B65B 11/22 53/466 |
| 2007/0119756 A1 | 5/2007 | Gianluigi | | |
| 2007/0125242 A1 | 6/2007 | Dall Omo et al. | | |
| 2008/0229709 A1 * | 9/2008 | Dall'Omo | ............. | B65B 25/146 53/211 |
| 2012/0273329 A1 | 11/2012 | Bernardi | | |
| 2013/0068591 A1 | 3/2013 | Overley et al. | | |

* cited by examiner

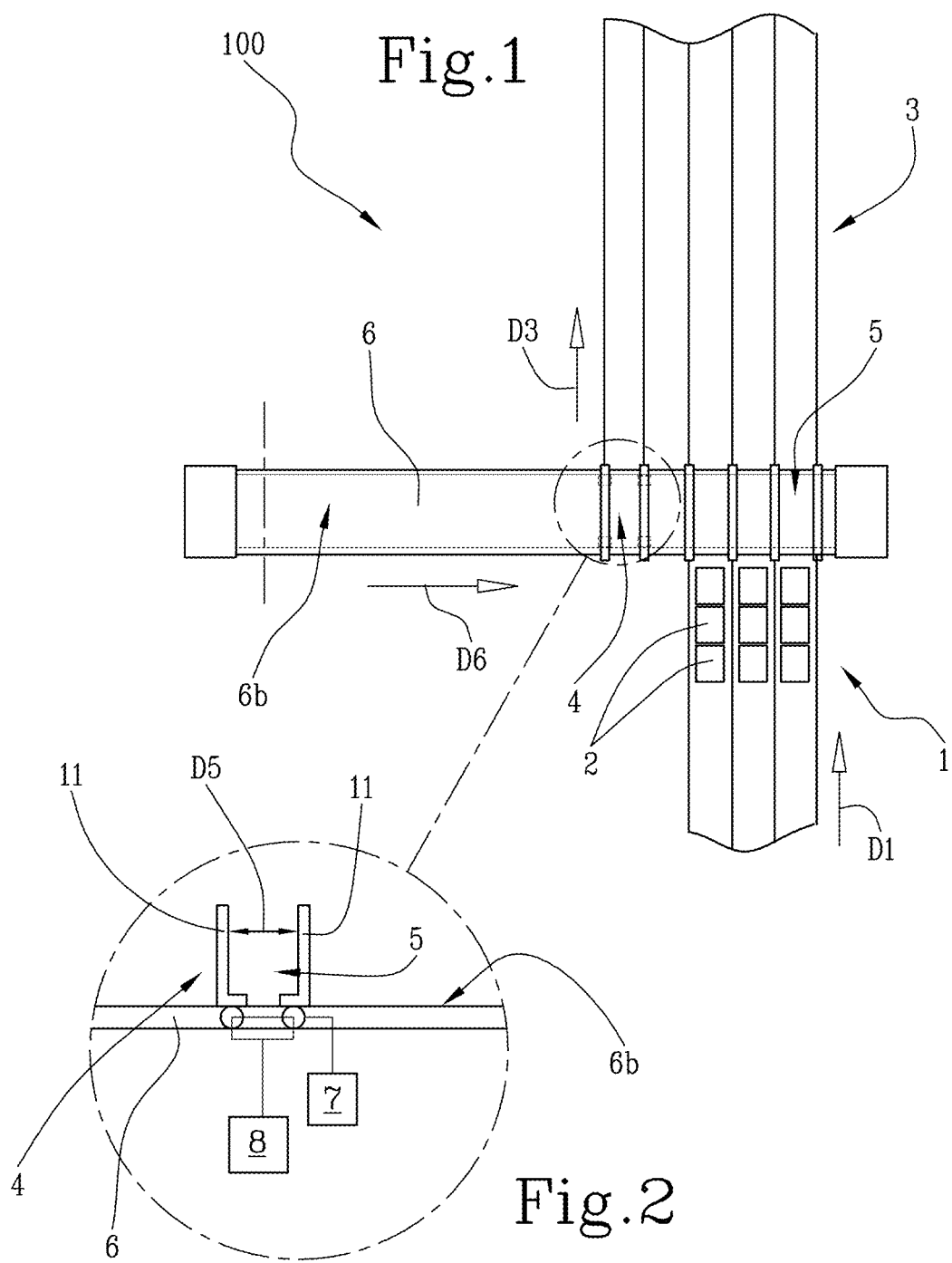

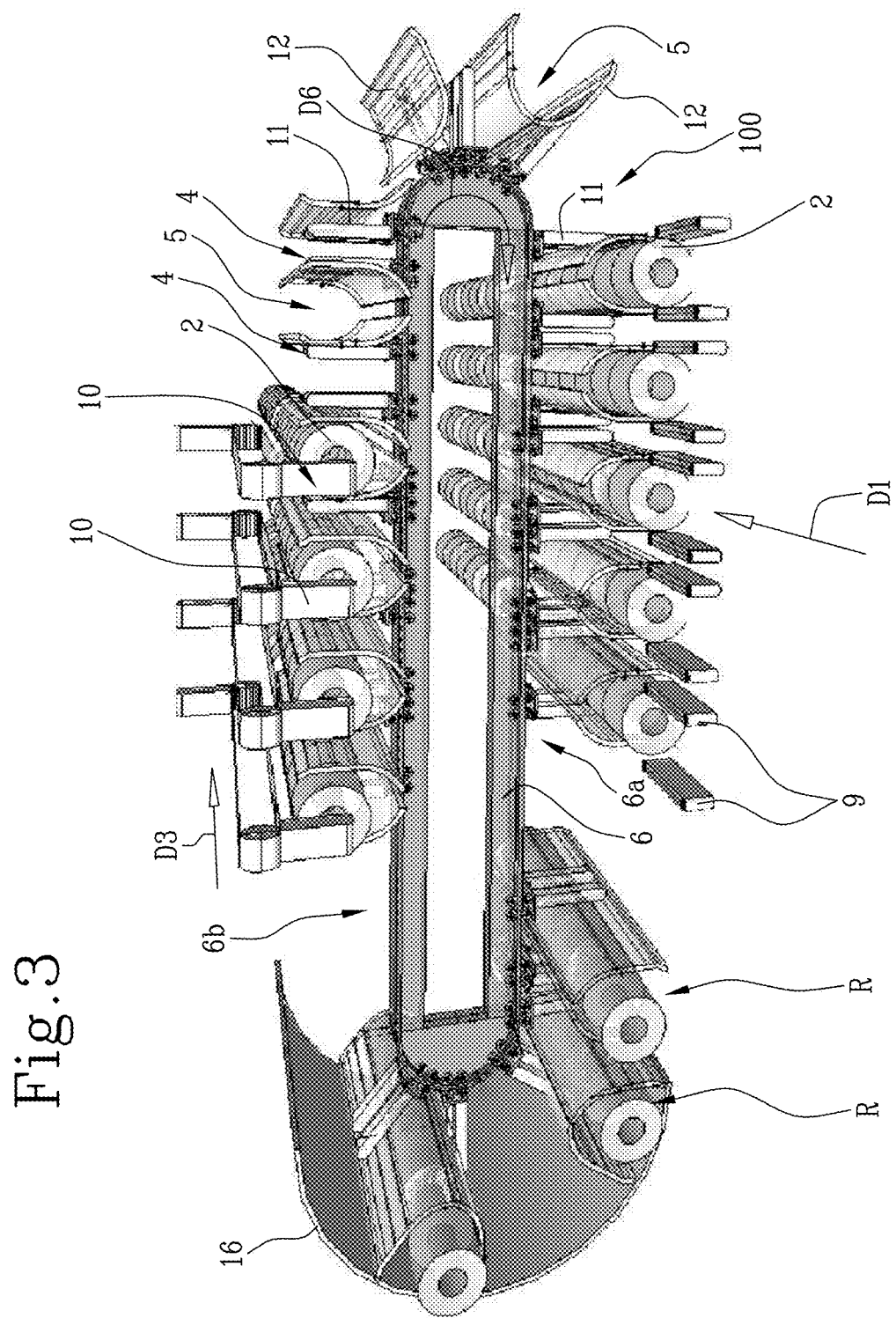

DEVICE FOR DISTRIBUTING PRODUCTS IN ROLL

This application claims priority of Italian Patent Application No. 102016000046574 filed May 5, 2016, which is hereby incorporated herein by reference.

BACKGROUND OF THE INVENTION

This invention relates to a device for distributing products in roll.

More specifically, the distribution device according to this invention is used for sorting/handling products arriving from a plurality of channels or feeding dosers for receiving and forwarding the products to packaging or grouping lines.

Currently, in the automatic lines for forming packages of groups of articles, these units usually consist of one or more rows of products arranged in one or more layers and wrapped in a protective wrapper made of plastic material of heat-sealable type.

It is known that in current lines for forming and packaging groups of products of the "tissue" type, for example rolls of toilet paper or kitchen paper, the latter are first formed and singularised in a single roll in suitable operating stations.

The rolls are then directed, by feeding units, towards an apparatus known as "diverter" or "switcher" or "sorter", which sorts and conveys the products towards a series of feed channels, either are equal in number or fewer or more than the number of dosing units which feed the sorting apparatus.

The feed channels, acting in conjunction with relative movement units, feed the products in a roll towards successive stations for defining the pack to be packaged.

The sequences currently used allow packs to made, starting from a predetermined number of feed channels, consisting of transversal rows side by side each comprising a number of rolls less than the number of feed channels, or at the most a number of rolls equal to the number of feed channels.

It is evident how the operating modes described above and used in the current lines for forming and packaging packs of rolls limit the possibility of packaging packs of different size with respect to the number of feed channels.

This problem can also be found in operating lines for feeding boxing units or equipment for palletising systems which require products packaged and arranged in of a number of predetermined rows and in any case different from that which may be made by the prior art packaging machines.

All this constitutes without doubt a drawback for the current lines for forming, packaging and handling in general packs of articles or groups of products in general.

In addition, the production lines must currently comprise two or more independent production units designed for packaging different types of formats (according to the market requirements) and which must also be all fed simultaneously.

For this reason, downstream of the sorting unit there may be present a large number of channels for feeding the products, the channels being served by the above-mentioned various production units with corresponding different types of format/rows side by side (single roll, double roll or formed with two or more layers of products) which require the continuous feeding of products.

In order to be able to satisfy this type of arrangement of multiple lines it is necessary, currently, to provide a large number of feed channels arranged side by side, with several sorting units, and a large number of dosing units. In addition, there may be product accumulation zones so as to be able to provide a buffer/standby products.

This means a high cost and a high level of monitoring inside the factory with obvious drawbacks in terms of the final cost of the packages.

SUMMARY OF THE INVENTION

The aim of this invention is to provide a device for distributing products which overcomes the above-mentioned drawbacks of the prior art.

More specifically, the aim of this invention is to provide a device for distributing products which is able to render the distribution of the products extremely elastic and reduce the product incoming and outgoing components.

A further aim of this invention is to provide a device for distributing products which is able to serve quickly and safely several production lines according of the needs of the lines and without blocking the dosing units.

Another aim of the invention is to provide a device for distributing products which is extremely flexible and programmable also for a dedicated and direct use to single or multiple packaging lines.

These aims are fully achieved by the device for distributing products in roll according to this invention as characterised in the appended claims.

BRIEF DESCRIPTION OF THE DRAWINGS

The features of the product distribution device will become more apparent from the following detailed description of a preferred, non-limiting embodiment of it, illustrated by way of example in the accompanying drawings, in which:

FIG. 1 is a schematic top plan view of a device for distributing products according to the invention;

FIG. 2 is a schematic front view of an enlarged detail of a pair of carriages of FIG. 1;

FIG. 3 is a front view of the device for distributing products according to this invention with some parts cut away;

DESCRIPTION OF THE PREFERRED EMBODIMENTS

Figure 4:
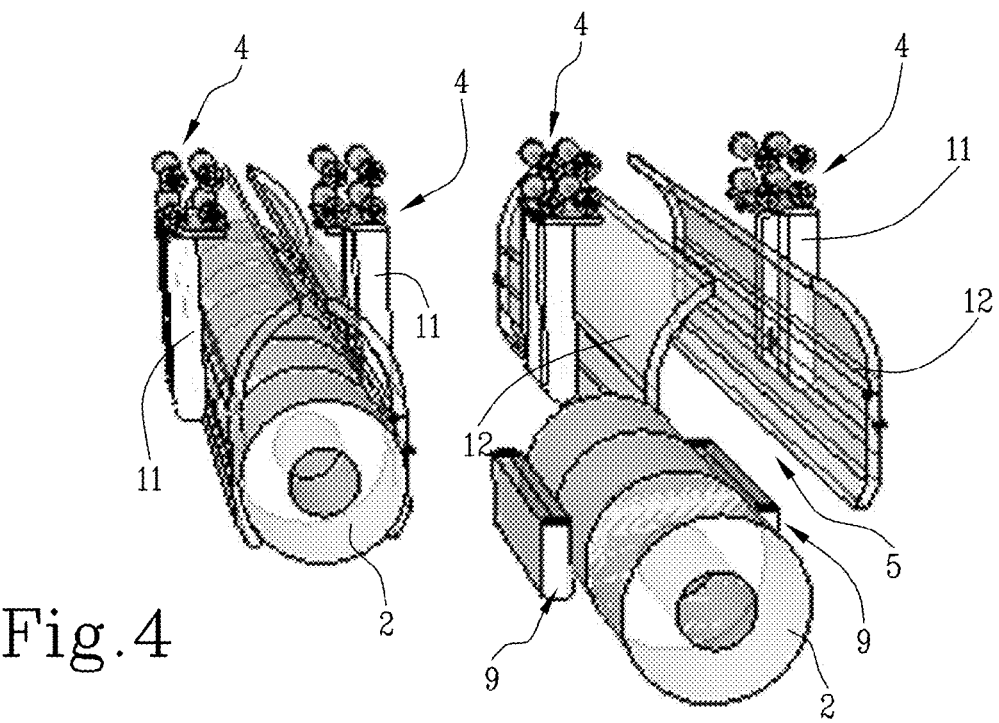
FIG. 4 is a schematic perspective view of a detail of a unit for feeding products of the device of FIG. 3.

With reference to the accompanying drawings and, in particular, to FIG. 1, the products distribution device, denoted by the numeral 100, is used for distributing products to feed lines for handling or packaging or grouping together products.

In this specification the products illustrated and distributed are rolls of paper (cylindrical product) merely by way of example, but without limiting the scope of the invention, since the products might be, again in the tissue paper sector, parallelepiped-shaped boxes (therefore rigid and with a certain geometry) containing, for example, paper tissues or in any case interleafed or folded products or in any case semi-rigid elements.

The distribution device 100 comprises a plurality of outfeed channels 1 each configured for feeding a succession of products 2 along a first feed direction D1.

This plurality of outfeed channels 1 is positioned at a first level H1.

The distribution device 100 also comprises plurality of infeed channels 3, configured to receive single or lines of products 2 and feed the products 2, along a second feed direction D3.

This plurality of infeed channels 3 is positioned at a second level H3.

It should be noted that the definition of outfeed channels 1 concerns the channels which are able to move to the sorting device the products feeding out from the products forming machine (upstream of the distribution device, and not illustrated).

The definition of the infeed channels 3 concerns the channels which feed the lines for handling, packaging or boxing the products positioned downstream of the distribution device.

It should be noted that the outfeed channels 1 and the infeed channels 3 can be equal in number.

Alternatively, the number of outfeed channels 1 and infeed channels 3 can be different according to the requirements downstream of the infeed channels 3.

In the configuration illustrated in the accompanying drawings, the first D1 and second D3 feed direction are at least parallel to each other.

As illustrated, the distribution device 100 also comprises a plurality of pairs of carriages 4 defining corresponding housing pockets 5.

The distribution device 100 also comprises a track 6 configured in the form of a closed, ring-shaped path to define a lower operating section 6a and an upper operating section 6b and on which move the plurality of pairs of carriages (4 along a direction D6 transversal to the first D1 and the second D3 feed directions.

In light of this, the track 6 is interposed between the plurality of outfeed channels 1 and the plurality of infeed channels 3 in such a way as to position at least along a lower operating section 6a, and in predetermined sequences, a first number of pairs of carriages 4 which can be faced towards corresponding outfeed channels 3 for picking up at least one corresponding product 2 and, at least along an upper operating section 6b, a second number of pairs of carriages 4 which can be faced towards the plurality of infeed channels 3 for releasing at least one corresponding product 2.

It should be noted that, due to the structure of the track 6, the plurality of infeed channels 3 are located at a second level H3 higher than the first level H1 of the plurality of infeed channels 1 (with reference to a treadable reference surface).

As illustrated in FIG. 2, preferably each pair of carriages 4 has means 7 for adjusting the mutual distance D5 between the two carriages 4 which are able to modify the width of the pocket 5 between a first operating position for infeed or release of at least one product 2 and a second operating position for retaining the at least one product 2.

Preferably, each pair of carriages 4 is associated with a corresponding motor-driven unit 8 configured for moving each pair of carriages 4 independently or in synchrony with the remaining pairs of motor-driven carriages 4 along the track 6.

Each pair of carriages 4 is therefore an independent unit controlled by a control unit (not illustrated), which allows groups of pairs of carriages in sequence to be formed, according to the operational requirements for distribution, by increasing or decreasing the number of pairs of infeed or discharge carriages in an extremely flexible manner.

The distribution device 100 comprises a plurality of positioning means 9, positioned between the plurality of outfeed channels 1 and the at least the lower operating section 6a engageable by the first number of pairs of carriages 4 (FIGS. 3 and 4).

The positioning means 9 (pairs of belts with a number at least equal to the number of outfeed channels 1 present) are configured to carry the corresponding products 2 leaving the outfeed channels 1 to the inside of the corresponding pocket 5 formed by each pair of carriages 4.

Figure 5:
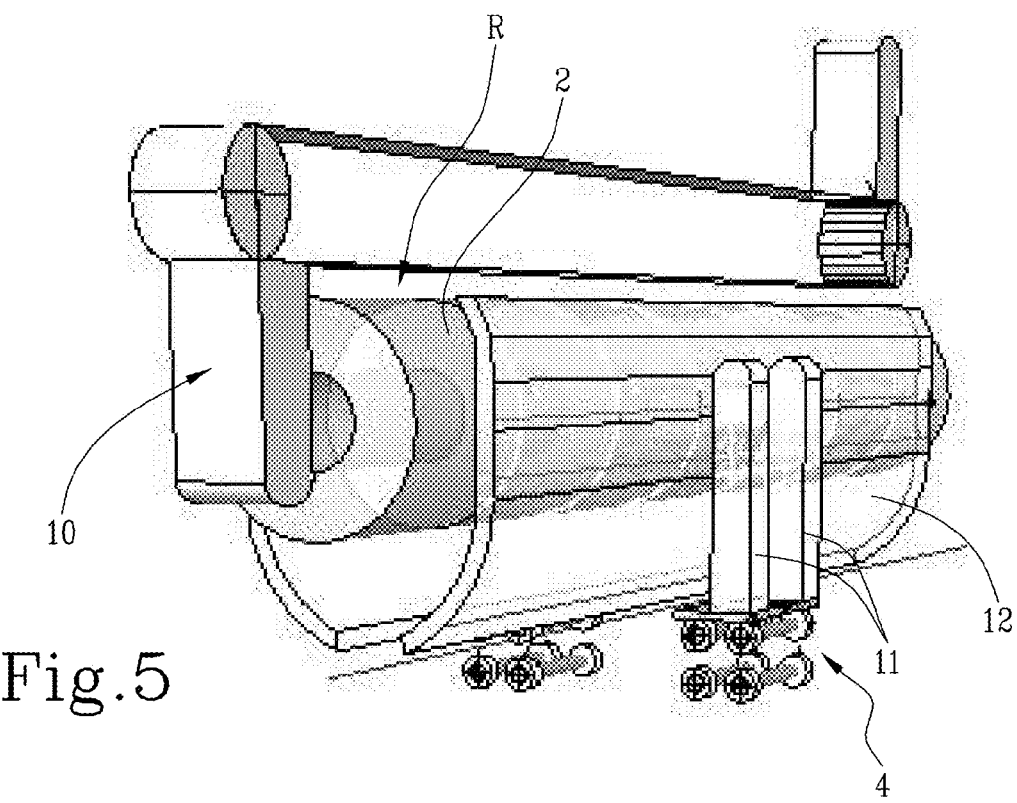
FIG. 5 is a schematic perspective view of a detail of a unit for discharging products of the device of FIG. 3.

Preferably, the distribution device 100 comprises a plurality of discharge means 10 (for example, pushers) located in the vicinity of the at least one upper operating section 6b engaged by the second number of pairs of carriages 4 (FIGS. 3 and 5).

The pushers 10 are configured for moving the products 2 present in the pairs of carriages 4 in the direction of the corresponding infeed channels 3 (and therefore free each pair of carriages 4).

It should be noted that each carriage 4 has a tooth 11 protruding transversely from the track 6 to define, with the tooth 11 of the other carriage 4 forming the pair, the pocket 5 for housing the at least one product 2 in the pair of carriages 4.

In an alternative embodiment, each pair of teeth 11 (forming a pair of carriages 4) is associated with respective half-cradles 12 configured to form a housing (for example cylindrical) which is able to contain a plurality of products 2 in succession to form a line R of products 2.

Preferably, the distribution device 100 also comprises at least one containment panel 16 with an extension shaped to match (for example, with an arc-shaped extension) the transition area between the lower operating section 6a and the upper operating section 6b of the track 6 in which the pairs of carriages 4 transit with the products 2 in the pockets 5.

Thanks to this system for containing products, it is possible to contain the centrifugal force effect which would occur during transfer into the transition area.

Thanks to a device structured in this way it is possible to distribute products in an extremely flexible manner with a reduced overall size of the of the structures.

There are many advantages of this structure.

The device is extremely flexible so as to be able to serve a number of channels starting from a number of different channels (more or less in number) and which adapts to the number of lines downstream and which may be balanced both upstream and downstream.

The device loads at a level and discharges at a different level, thus guaranteeing immediate flows.

The device guarantees, if necessary, a compression on the product independently for each row of products which enters and/or leaves.

The device avoids the need for a specific space for accumulating incoming and/or outgoing products as is currently normally the case with prior art systems.

To give an example of the flexibility of the machine, it is assumed that a fixed number of outfeed channels correspond to five infeed channels (greater than the outfeed channels) to serve three apparatuses; the first requiring three rows, the second requiring a row and the third requiring a row.

If all the machines which make up the infeed channels are in operation, the distributor has exactly all the rows simultaneously and with the same frequency (that is to say, they are balanced and each machine absorbs an equal quantity of products per unit of time).

In the case of imbalance (higher performing apparatus or machine stoppages) the distributor may be programmed to serve with a priority a sub-set of the infeed channels providing more products to the higher performing machine, or, in the event of a stoppage of one of the machines, only those which remain in operation are served. Obviously the speed/frequency of the discharges from the outfeed channels must reduce in proportion to the number of machines remaining.

In addition, the device may also be used as a direct distributor feeder for "twin" machines (single product packaging, as mentioned below, confirming its highly flexible of use).

Figure 6:
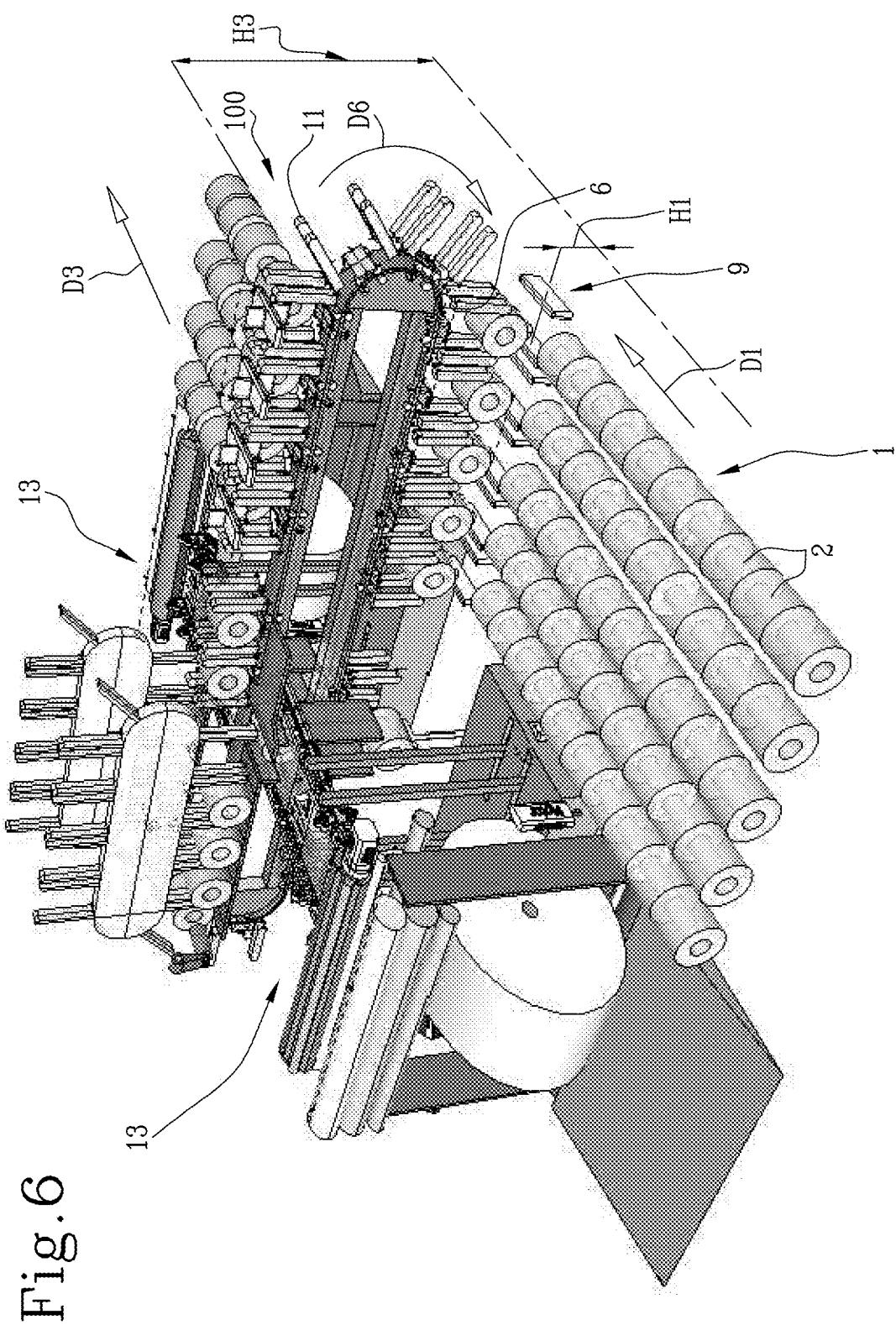
FIG. 6 is a schematic perspective view of the products distribution device in an operating configuration for serving the packaging unit.

In this case, the distribution device 100 is integrated with at least one unit 13 for packaging single products 2 located in a free zone by the outfeed channels 1 or the infeed channels 3 (FIG. 6).

Figure 7:
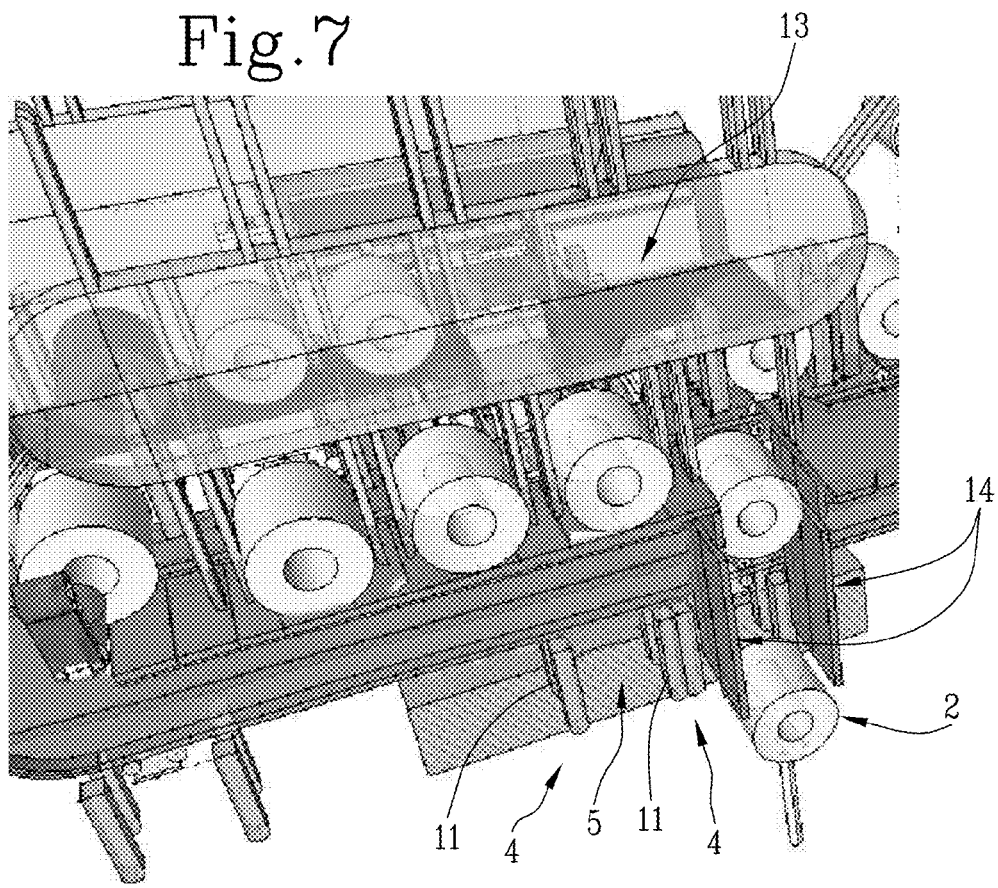
FIG. 7 illustrates a partial perspective view of a detail of FIG. 6.

The unit 13 has pick-up means 14 located in the vicinity of a further lower operating section 6a of the track 6, which is free from the outfeed channels 1 or the infeed channels 3. (FIG. 7)

The pick-up means 14 are configured to pick up a single product 2 from a corresponding pair of carriages 4 which can be positioned in the vicinity of the pick-up means 14.

Figure 8:
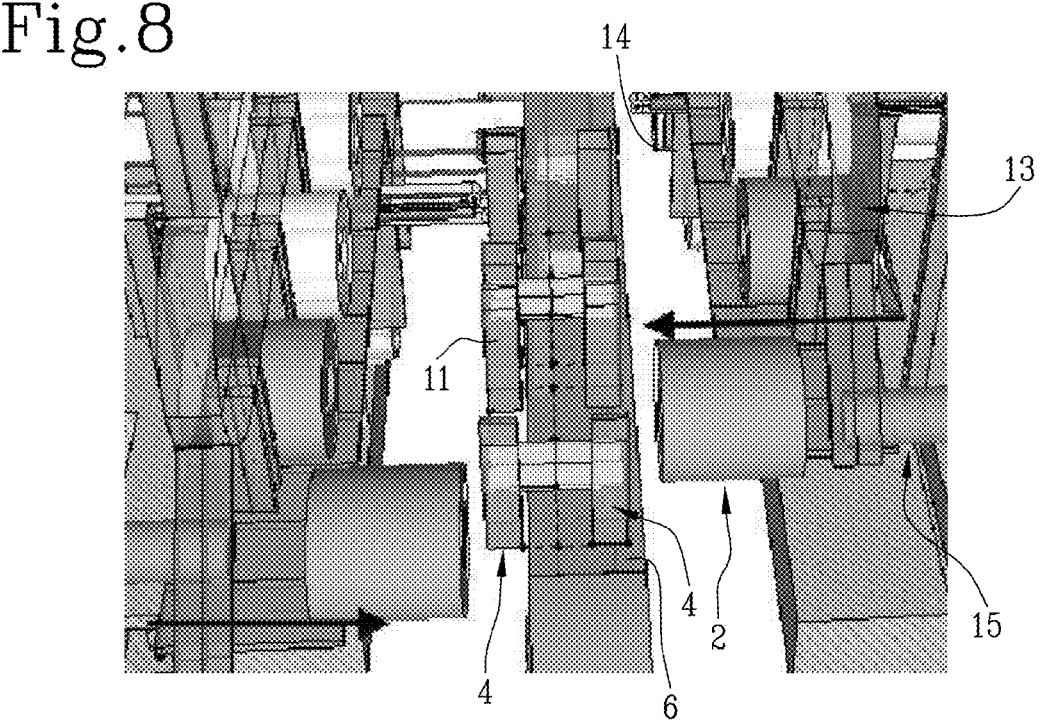
FIG. 8 illustrates a partial perspective view of a further detail of FIG. 6.

Moreover, the packaging unit 13 has discharge means 15 located in the vicinity of a further upper operating section 6b of the track 6, which is free from the outfeed channels 1 or the infeed channels 3. (FIG. 8)

These discharge means 15 are configured to release a single product 2 at a time packaged at a corresponding pair of free carriages 4 which can be positioned in the vicinity of the discharge means 15.

FIG. 6 shows, merely by way of non-limiting example, a configuration with two packaging unit 13 positioned on both sides of the track 6.

The carriages—track unit may be substantially used as follows, illustrating the steps for a single apparatus.
- launching roll from the outfeed channels;
- receiving roll in a pocket of a pair of carriages;
- retaining roll in the pocket and transfer along the lower operating section (towards the apparatus);
- positioning pocket at the pick-up means which introduce the roll in the packaging zone (by raising it);
- packaging the single roll through a transfer movement of the roll in the same direction of movement as the pairs of carriages along the lower operating section of track (FIG. 7);
- discharging the packaged roll on the upper operating section upper with transfer of the product by the apparatus to a pair of free carriages;
- movement of the pair of carriages with the packaged roll until reaching the infeed channels for discharging the packaged roll.

What is claimed is:

1. A device for distributing products to feed lines, comprising at least:
   - a plurality of outfeed channels each configured for feeding a succession of products along a first feed direction; the plurality of outfeed channels being located at a first level;
   - a plurality of infeed channels, configured to receive single or lines of products and feed the products, along a second feed direction; the plurality of infeed channels being positioned at a second level,
   - a plurality of pairs of carriages defining respective housing pockets;
   - a track configured in the form of a closed, ring-shaped path to define a lower operating section and an upper operating section and on which move the plurality of pairs of carriages along a direction transverse to the first and second feed directions; the track being interposed between the plurality of outfeed channels and the plurality of infeed channels in such a way as to position at least along a lower operating section, and in predetermined sequences, a first number of pairs of carriages which can be faced towards corresponding outfeed channels for picking up at least one corresponding product and, at least along an upper operating section, a second number of pairs of carriages which can be faced towards the plurality of infeed channels for releasing at least one corresponding product.

2. The device according to claim 1, wherein the mutual distance between the two carriages of each pair of carriages is adjustable to modify the width of the pocket between a first operating position for infeed or release of at least one product and a second operating position for retaining the at least one product.

3. The device according to claim 1, wherein each pair of carriages is associated with a corresponding motor-driven unit configured for moving each pair of carriages independently or in synchrony with the remaining pairs of motor-driven carriages along the track.

4. The device according to claim 1, comprising a plurality of positioning means, positioned between the plurality of outfeed channels and the at least the lower operating section engageable by the first number of pairs of carriages, and configured to carry the corresponding products leaving the outfeed channels to the inside of the corresponding pocket formed by each pair of carriages.

5. The device according to claim 1, comprising a plurality of discharge means located in the vicinity of the at least one upper operating section engaged by the second number of pairs of carriages and configured for moving the products present in the pairs of carriages in the direction of the corresponding infeed channels.

6. The device according to claim 1, wherein each carriage has a tooth protruding transversely from the track to define, with the tooth of the other carriage, the pocket for housing the at least one product in the pair of carriages.

7. The device according to claim 6, wherein each pair of teeth is associated with respective half-cradles configured to form a housing which is able to contain a plurality of products in succession to form a line of products.

8. The device according to claim 1, comprising at least one unit for packaging single products located in a free zone by the outfeed channels or the infeed channels; the unit having a pick-up located in the vicinity of a further lower operating section of the track, which is free from the outfeed channels or the infeed channels, configured to pick up a single product from a corresponding pair of carriages which can be positioned in the vicinity of the pick-up.

9. The device according to claim 8, wherein the at least one unit for packaging has discharge means located in the vicinity of a further upper operating section of the track, which is free from the outfeed channels or the infeed channels, and configured to release a single product at a time packaged at a corresponding pair of free carriages which can be positioned in the vicinity of the discharge means.

10. The device according to claim 1, comprising at least one covering panel positioned along a transition area between the lower operating section and the upper operating section of the track in which the pairs of carriages transit with the products in the pockets.

11. The device according to claim 1, wherein the plurality of infeed channels are located at a second level higher than the first level of the plurality of outfeed channels.

* * * * *